Sept. 10, 1957     S. R. BUNCE     2,805,512
FISHING LURE
Filed July 19, 1955

STANLEY R. BUNCE
INVENTOR.

BY *James D. Girnan*
ATT'Y

United States Patent Office 2,805,512
Patented Sept. 10, 1957

2,805,512

FISHING LURE

Stanley R. Bunce, Gresham, Oreg.

Application July 19, 1955, Serial No. 523,002

1 Claim. (Cl. 43—42.18)

This invention relates to improvements in artificial fishing lures and bait and is particularly directed to a lure for use in trolling.

A primary object of this invention is to provide a fishing lure which includes a tandem series of body members of thin sheet material which body members are connected together for independent lateral and rotative movements while being trolled.

A further important object of this invention is to provide a fishing lure which includes a leading body member that is formed to impart a controlled vertical serpentine movement to the lure and which also includes a pair of trailing body members that are connected by swivel connections to the leading body member and are capable of independent lateral or sidewise motions to simulate the swimming motion of a fish.

A further important object of this invention is to provide a simple, compact and extremely effective fishing lure which can be inexpensively manufactured and can be easily stored in a very small space.

The foregoing and ancillary objects are attained by this invention, the preferred form of which is set forth in the following description and illustrated in the accompanying drawing, wherein.

Figure 1:
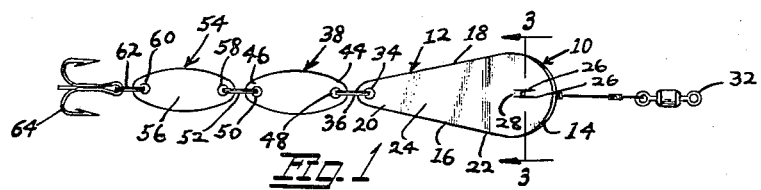
Figure 1 is a top plan view of the fishing lure of this invention.
Figure 2:
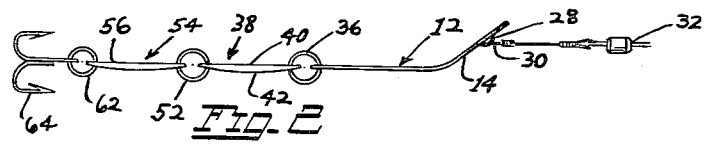
Figure 2 is a side elevational view thereof.
Figure 3:
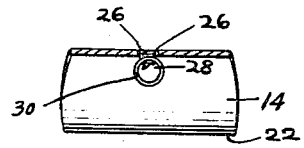
Figure 3 is a transverse cross-sectional view taken on line 3—3 of Figure 1.

Referring now more particularly to the accompanying drawing, the fishing lure 10 is comprised of three body members or discs 12, 38 and 54 which are arranged in longitudinal, end to end alignment or in tandem series.

The body member 12 constitutes the leading member of the series and is formed of a single piece of sheet metal or the like sheet material, such as plastic, of the desired stiffness. The body member is of tear drop shape and is elongated having a semi-circular forward end portion 14. The sides 16 and 18 of the body portion are straight from the forward end portion and converge therefrom relative to a reduced, semi-circular rearward end portion 20. The forward end portion constitutes the major end portion and is considerably wider than the rearward end portion 20, which is the minor end portion of the body member.

The forward end portion is bent upwardly on the transverse line 22 out of the plane of the intermediate triangular portion 24 which terminates in the rounded minor end portion 20. The intermediate portion 24 and rearward minor end portion 20 are flat and coplanar while the forward major end portion 14 is sloped upwardly and forwardly therefrom at an obtuse angle.

The forward major end portion has parallel slits 26 formed therein and spaced slightly apart and the material between the slits is punched downwardly to form an outstruck eye 28, to which a ring 30 is attached. The ring 30 serves as an attachment means for the trolling line 32.

The rearward minor end portion 20 is formed, adjacent its outer rounded terminal, with an opening 34 in which a ring 36 is attached to connect the second or intermediate body member or disc 38 to the leading body member 12.

The intermediate body member 38 is substantially ovoid shaped in plan and has a flat upper surface 40 and a convex under surface 42. The body member 38 is formed in one piece from a suitable transparent material, such as a transparent plastic or the like and has opposing reduced and rounded forward and rearward ends 44 and 46. The ends are apertured, as at 48 and 50, to receive the ring 36 and a similar ring 52.

The ring 52 swivelly connects a third or trailing body member or disc 54 to the intermediate body member. The trailing body member 54 is of the same dimensions and shape as the intermediate body member and both the intermediate and trailing body members are of a width, at their widest central points, less than the width of the forward end portion 14 of the leading body member 12 at the transverse bend 22. The upper surface 56 of the trailing body member 54 is dished or concaved so that the body member is concavo-convex.

The body member 54 has openings 58 and 60 in its ends, the opening 58 receiving the ring 52 while the opening 60 receives a ring 62 which is connected to a trailing treble hook 64.

The rings 36, 52 and 62 are preferably of the same size and swivelly connect the body members and the hook together.

It will be obvious, from the foregoing description and the accompanying drawing, that the lure 10 is of particularly fish luring construction and that in use it will achieve a movement simulative of a swimming fish. By virtue of its construction, it is not complex but will be highly attractive to fish while, at the same time being sturdy and durable.

While the preferred form of this invention has been shown and described herein, other forms may be commercially realized as come within the scope of the invention defined by the appended claim.

What is claimed is:

A fishing lure comprising a series of discs arranged in tandem and including a leading disc, an intermediate disc and a trailing disc, said intermediate and trailing discs being substantially ovoid shaped in plan and of the same size and planar dimensions, rings swivelly connecting the discs together and connecting a hook to the trailing disc, said leading disc being of a tear-drop shape and having a semi-circular major forward end portion and a flat reduced and terminally rounded rearward end portion, said rearward end portion being adapted to be coplanar with the intermediate and trailing discs, the forward end portion being bent upwardly and forwardly from the rearward end portion and having two parallel slits formed therein, the material between the slits being punched downwardly to form an outstruck eye, and a ring attached to said eye to serve as an attachment means for a trolling line.

References Cited in the file of this patent

UNITED STATES PATENTS

| 1,297,617 | Wells | Mar. 18, 1919 |
| 2,037,310 | Bryan | Apr. 14, 1936 |
| 2,043,001 | Lambrecht | June 2, 1936 |

FOREIGN PATENTS

| 525,864 | Germany | May 29, 1931 |